United States Patent
Gerstler et al.

(10) Patent No.: US 10,041,375 B2
(45) Date of Patent: Aug. 7, 2018

(54) APPARATUS FOR OIL COLLECTION AND HEAT EXCHANGING FOR TURBINE ENGINES

(71) Applicant: GENERAL ELECTRIC COMPANY, Schenectady, NY (US)

(72) Inventors: William Dwight Gerstler, Niskayuna, NY (US); Bugra Han Ertas, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 269 days.

(21) Appl. No.: 14/936,868

(22) Filed: Nov. 10, 2015

(65) Prior Publication Data
US 2017/0130605 A1 May 11, 2017

(51) Int. Cl.
| F01D 25/12 | (2006.01) |
| F01D 15/08 | (2006.01) |
| F01D 15/00 | (2006.01) |
| F02C 7/36 | (2006.01) |
| F01D 15/12 | (2006.01) |
| F01D 25/18 | (2006.01) |

(52) U.S. Cl.
CPC ............ *F01D 25/125* (2013.01); *F01D 15/00* (2013.01); *F01D 15/08* (2013.01); *F01D 15/12* (2013.01); *F01D 25/12* (2013.01); *F01D 25/18* (2013.01); *F02C 7/36* (2013.01)

(58) Field of Classification Search
CPC ........ F01D 25/125; F01D 25/12; F01D 25/18; F01D 15/00; F01D 15/12; F01D 15/08; F02C 7/36

USPC .......... 475/159, 160, 161; 184/6.12; 165/41, 165/51, 52, 104.19, 104.28, 104.33, 165, 165/178
See application file for complete search history.

(56) References Cited

U.S. PATENT DOCUMENTS

| 3,788,426 A | 1/1974 | Hull, Jr. |
| 4,693,672 A | 9/1987 | Carvalho |
| 5,193,645 A | 3/1993 | Francois |
| 7,508,101 B2 | 3/2009 | Kaminski et al. |
| 8,534,044 B2 | 9/2013 | Smith |
| 8,820,478 B2 | 9/2014 | Gauthier et al. |

(Continued)

FOREIGN PATENT DOCUMENTS

| WO | 9114877 A1 | 10/1991 |
| WO | 2012104152 A3 | 8/2012 |

OTHER PUBLICATIONS

Kim et al.,"Distributed Turboelectric Propulsion for Hybrid Wing Body Aircraft", 2008 International powered lift conference sponsored by Royal Aeronautical society, 11 pages, Jul. 22-Jul. 24, 2008.

*Primary Examiner* — Justin Seabe
*Assistant Examiner* — Behnoush Haghighian
(74) *Attorney, Agent, or Firm* — GE Global Patent Operation; Nitin N. Joshi (57) ABSTRACT

Embodiments of a heat exchanger for turbine engines are provided herein. In some embodiments, a heat exchanger for a turbine engine may include a body configured to be disposed proximate and at least partially surrounding a heat source, wherein the body defines a cavity configured to capture a heated fluid expelled from the heat source; and a channel formed in the body, the channel fluidly coupled to a heat sink.

14 Claims, 5 Drawing Sheets

(56) References Cited

U.S. PATENT DOCUMENTS

| | | | |
|---|---|---|---|
| 8,985,278 B2* | 3/2015 | Xu | F01D 25/18 |
| | | | 184/6.11 |
| 9,030,063 B2 | 5/2015 | Rawlinson et al. | |
| 9,114,877 B2 | 8/2015 | Weber et al. | |
| 2012/0233977 A1 | 9/2012 | Leese | |
| 2014/0044525 A1* | 2/2014 | Storage | F28F 3/12 |
| | | | 415/144 |

* cited by examiner

APPARATUS FOR OIL COLLECTION AND HEAT EXCHANGING FOR TURBINE ENGINES

BACKGROUND

The field of the disclosure relates generally to heat exchangers, and more particularly, to an apparatus for oil collection and heat exchanging for turbine engines.

Conventional turbine engine configurations having separate components coupled to a common shaft may require different rotational speeds to perform a desired function. For example, a turbine may have a required rotational speed that is significantly higher that a required rotational speed of a fan. To accommodate for this difference in speed a gear box (e.g., a power gear box (PGB)) may be utilized between the fan and low pressure turbine to allow each of the components to operate at different speeds. However, such gear box configurations generate a significant amount of heat due to, for example, mechanical and windage losses associated with rotating components of the gearbox, thereby creating a significant heat load burden on the engine. The inventors have observed that conventionally utilized mechanisms to remove heat (e.g., thermal circuits) are insufficient to efficiently remove the amount of heat generated by the gearbox. Moreover, adapting a conventionally utilized system to remove such an amount of heat would require a significant addition of weight to the engine, and thus, an increased drag on the engine.

Therefore, the inventors have provided a heat exchanger for turbine engines.

BRIEF DESCRIPTION

Embodiments of a heat exchanger for turbine engines are provided herein. In some embodiments, a heat exchanger for a turbine engine may include a body configured to be disposed proximate and at least partially surrounding a heat source, wherein the body defines a cavity configured to capture a heated fluid expelled from the heat source; and a channel formed in the body, the channel fluidly coupled to a heat sink.

In some embodiments, a gas turbine engine may include a fan having a fan shaft; a first shaft rotatably coupling a first turbine to a second turbine; a gear box rotatably coupling the first shaft to the fan shaft; and a heat exchanger disposed proximate the gear box, the heat exchanger comprising: a body configured at least partially surrounding at least one gear of the gear box, wherein the body defines a cavity configured to capture a heated fluid expelled from the heat source; and a channel formed in the body, the channel fluidly coupled to a heat sink.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a heat exchanger are provided herein. In at least some embodiments, the inventive heat exchanger may advantageously allow for an extraction of heat proximate a heat source, thereby reducing or eliminating instances of unintentional heating of engine components that is typically observed in conventional heat thermal circuits that require the transport of heated oil throughout the engine. In addition, by reducing heating of other engine components, an overall heat transfer burden on the system is reduced, thus making the entire systems lighter and smaller in volume, and as such, provides a reduction in both the weight and drag on the engine. Moreover, in at least some embodiments, the inventive heat exchanger provides a mechanism for a controlled collection of gear box and/or engine oil (collectively referred to as oil) as compared to conventional systems that allow unrestricted distribution of such oil about various surfaces of the gear box.

Figure 1:
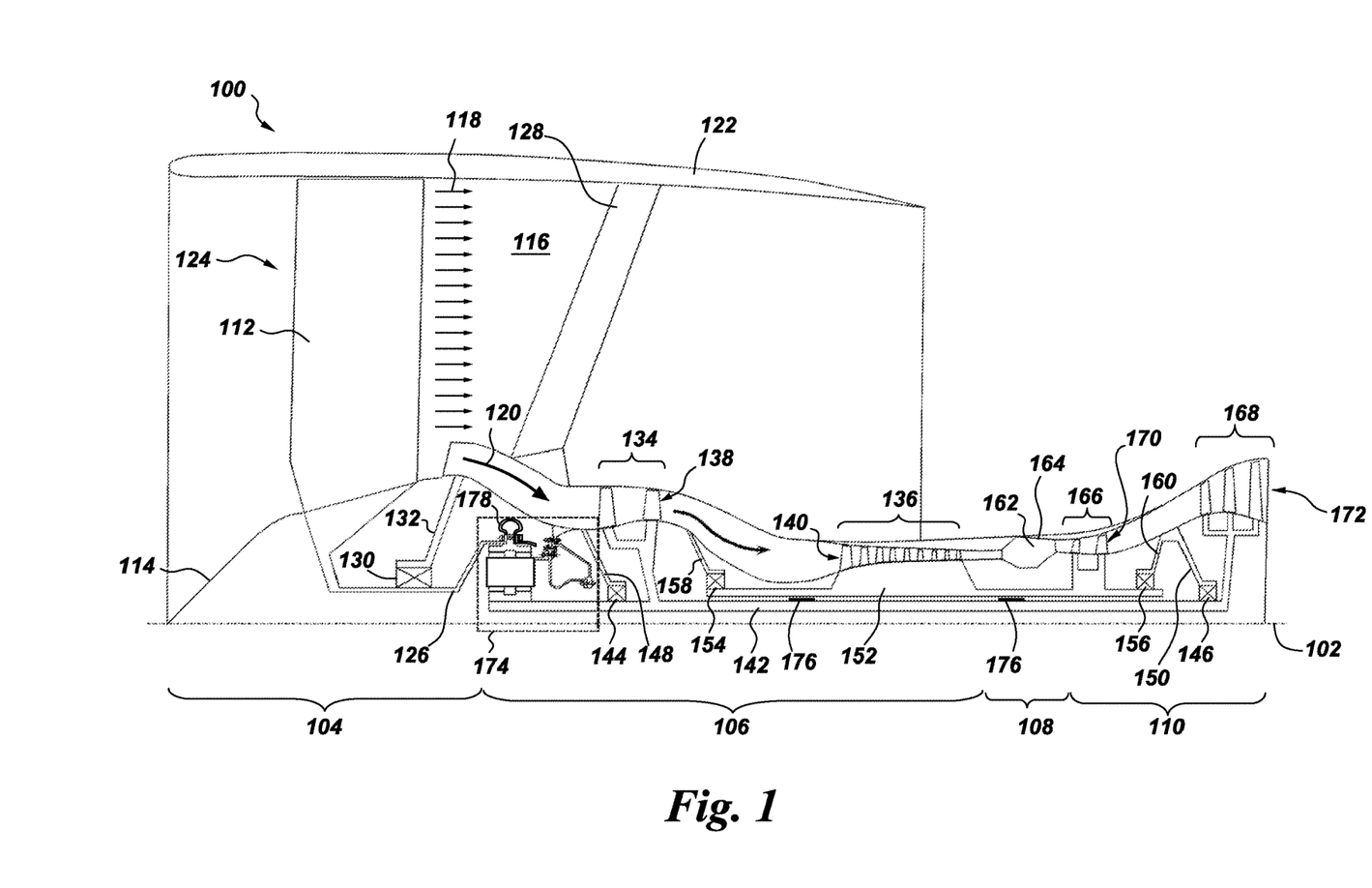
FIG. 1 is a partial schematic view of an engine in a accordance with some embodiments of the present invention.

FIG. 1 is a partial cross sectional view of an engine 100. In the exemplary embodiment, the engine 100 is a gas turbine engine suitable for use in, for example, aviation or marine applications. Alternatively, the engine 100 may be any other turbine engine and/or turbomachine, including, without limitation, a steam turbine engine, a centrifugal compressor, and a turbocharger. Although only a portion is shown, it is to be understood that the engine 100 may be annular in form, for example about an axis 102. In some embodiments, the engine 100 may generally comprise an air intake section 104, compression section 106, combustion section 108 and turbine section 110.

The air intake section 104 generally comprises a fan 124 having a plurality of fan blades 112 coupled to a hub 114 and a rotatable fan shaft 126. One or more bearings 130 may be disposed between a stationary support 132 and the fan shaft 126 to facilitate rotation of the fan shaft 126 and/or dampen vibrational energy imparted on the fan shaft 126 during operation of the engine 100. The one or more bearings may be any type of bearings suitable for use within the engine 100, for example, such as gas bearings, journal bearings, or the like. In some embodiments, a casing 122 may be disposed about the fan 124 and at least a portion of the engine 100, thereby forming a passage 116 for a flow of air (e.g., bypass air) driven by the fan 124, such as indicated by arrows 118. In such embodiments, the casing 122 may be at least partially supported by a plurality of struts (one strut 128 shown). In operation, the fan 124 draws air into the engine 100, directing at least a portion of the air through the passage 116 and at least a portion of the air into the compressor section 106.

The compression section 106 is mechanically and fluidly coupled to the fan section 104 and generally comprises one or more compressors, for example, such as a first compressor (low pressure compressor) 134 and second compressor 136 (high pressure compressor), as shown in the figure.

The first compressor 134 receives the directed air from the air intake section 104 and compresses the air via a plurality of compressor blades, vanes or stages (collectively shown at 138). In some embodiments, the compressor blades 138 may be coupled to a first shaft (low pressure turbine (LPT) shaft) 142 to drive rotation of the compressor blades 138. One or more bearings (a first, or forward end low pressure turbine bearing 144 and a second, or aft end low pressure turbine bearing 146 shown) may be disposed between one or more stationary supports 148, 150 and the LPT shaft 142 to facilitate rotation of the LPT shaft 142 and/or dampen vibrational energy imparted on the LPT shaft 142 during operation of the engine 100. The one or more bearings may be any type of bearings suitable for use within the engine 100, for example, such as gas bearings, journal bearings or the like.

The second compressor 136 receives the compressed air from the first compressor 134 and further compresses the air via a plurality of compressor blades or stages (collectively shown at 140). In some embodiments, the compressor blades 140 may be coupled to a high pressure turbine (HPT) shaft (core shaft) 152 to drive rotation of the compressor blades 140. One or more bearings (a third, or forward end high pressure turbine bearing, 154 and a fourth, or aft end high pressure turbine bearing 156 shown) may be disposed between one or more stationary supports 158, 160 and the HPT shaft 152 to facilitate rotation of the HPT shaft 152 and/or dampen vibrational energy imparted on the HPT shaft 152 during operation of the engine 100. The one or more bearings may be any type of bearings suitable for use within the engine 100, for example, such as gas bearings, journal bearings or the like.

Although only a limited number of compressors and limited number of stages for each compressor are shown in the figure, any number of compressors and/or compressor stages may be present to facilitate suitable operation of the engine 100 for a desired application.

The combustion section 108 receives the compressed air from the second compressor 136, mixes the compressed air with a fuel, and facilitates an ignition of the fuel/air mixture. The combustion section 108 generally includes a combustor 162 having a combustion chamber 164 mechanically and fluidly coupled to the compression section 106 and turbine section 110. The combustor 162 may be any type of suitable combustor known in the art and may include any components (e.g., cowls, swirlers, nozzles, igniters, fuel injectors, or the like) required to facilitate the ignition of the fuel/air mixture as described above.

The turbine section 110 is mechanically and fluidly coupled to the combustion section 108 and generally comprises one or more turbines, for example, such as a first turbine (high pressure turbine) 166 and second turbine (low pressure turbine) 168 as shown in the figure. Although only a limited number of turbines and limited number of stages for each turbine are shown in the figure, any number of turbines and/or turbine stages may be present to facilitate suitable operation of the engine 100 for a desired application.

In some embodiments, the first turbine 166 and second turbine 168 each may comprise a plurality of turbine blades and turbine nozzles, or stages (collectively shown at 170 and 172). With respect to the first turbine 166, the turbine blades 170 may be coupled to the HPT shaft 152, which is coupled to the second compressor 136, as described above. In operation of such embodiments, the first turbine 166 receives the heated air from the combustion section 108 and coverts at least a portion of the thermal energy (e.g., provided by ignition of the fuel/air mixture in the combustion chamber 164) into mechanical rotational energy via the plurality of turbine blades 170. The rotation of the turbine blades 170 causes the HPT shaft 152 to rotate, thereby causing the compressor blades 140 of the second compressor 136 to rotate.

With respect to the second turbine 168, the turbine blades 172 may be coupled to the LPT shaft 142, which is coupled to the first compressor 134, as described above. In some embodiments, the LPT shaft 142 may also be coupled to the fan shaft 126, for example, such as shown in FIG. 1. In operation, the second turbine 168 receives the heated air from the first turbine 166 and coverts at least another portion of the thermal energy into mechanical rotational energy via the plurality of turbine blades 172. The rotation of the turbine blades 172 causes the second shaft 142 and the fan shaft 126 to rotate, thereby causing the compressor blades 138 of the second compressor 134 and the fan 124 to rotate.

Although described above in the context of an engine having a two spool configuration (e.g., a high pressure (HP) spool comprising a HP turbine and HP compressor and low pressure (LP) spool comprising a LP turbine and LP compressor), it is to be understood that the engine may have a three spool configuration having an intermediate spool (e.g., an intermediate spool comprising an intermediate turbine and intermediate compressor).

The inventors have observed that in conventional engine configurations (e.g., such as shown in FIG. 1) separate components coupled to a common shaft may require different rotational speeds to perform a desired function. For example, the second turbine 168 may have a required rotational speed that is significantly higher that a required rotational speed of the fan 124. For example, in some embodiments, the second turbine 168 may have a rotational speed requirement of about 11,000 revolutions per minute (rpm) and the fan 124 may have a rotational speed requirement of about 2,400 to about 3000 rpm. To accommodate for this difference in speed, in some embodiments, a gear box 174 may be utilized to allow each of the components (e.g., the low pressure/second turbine 168 and fan 124) to operate at different speeds. In such embodiments, the gear box (power gear box (PGB)) 174 may couple the LPT shaft 142 to the fan shaft 126, for example, such as shown in FIG. 1. The gear box 174 may be any type of gear box suitable to facilitate coupling the LPT shaft 142 to the fan shaft 126 while allowing each of the second turbine 168 and fan 124 to operate at a desired speed. For example, in some embodiments, the gear box 174 may be a reduction gearbox. Utilizing a reduction gear box may enable the comparatively higher speed operation of the second turbine 168 while maintaining fan speeds sufficient to provide for increased air bypass ratios, thereby allowing for efficient operation of the engine 100. Moreover, utilizing a reduction gear box may allow for a reduction in turbine stages that would otherwise be present (e.g., in direct drive engine configurations), thereby providing a reduction in weight and complexity of the engine.

The inventors have further observed that, due to, for example, mechanical and windage losses associated with rotating components of the gear box, the gear box may generate a significant amount of heat, thereby creating a significant heat load burden on the engine. Moreover, conventionally utilized mechanisms to remove heat (e.g., thermal circuits) are insufficient to efficiently remove the amount of heat generated by the gearbox. For example, conventional thermal circuits typically rely on the transport of the heated oil from the gear box to a heat exchanger disposed in a separate location within the engine via a plurality of conduits. However, such systems are inefficient and may result in unintended heating of other components of the engine as the heated oil is moved about the engine. In addition, adapting such a conventionally utilized system to remove the amount of heat generated by the gear box would require a significant addition of weight to the engine, and thus, an increased drag on the engine.

As such, in some embodiments, a heat exchanger 178 may be disposed proximate the gears of the gear box 174. The inventors have observed that by locating the heat exchanger 178 in such a manner, heat may be extracted from heated oil at a location that is proximate, or at, the heat source (e.g., gears of the gear box), thereby maximizing the effectiveness of the heat exchanger 178 by creating a maximum obtainable difference in temperature ($\Delta T$) between the heated oil and the heat exchanger 178. Moreover, extracting heat proximate the heat source reduces or eliminates instances of unintentional heating of engine components typically observed in conventional heat thermal circuits that require the transport of heated oil throughout the engine. In addition, by reducing heating of other engine components, an overall heat transfer burden on the system is reduced, thus making the entire systems lighter and smaller in volume, and as such, provides a reduction in both the weight and drag on the engine.

Although the gears of the gear box are described above as the heat source from which the heat exchanger 178 extracts heat, it is to be understood that the heat exchanger 178 may be utilized to remove heat from any heat source within an engine.

Figure 2:
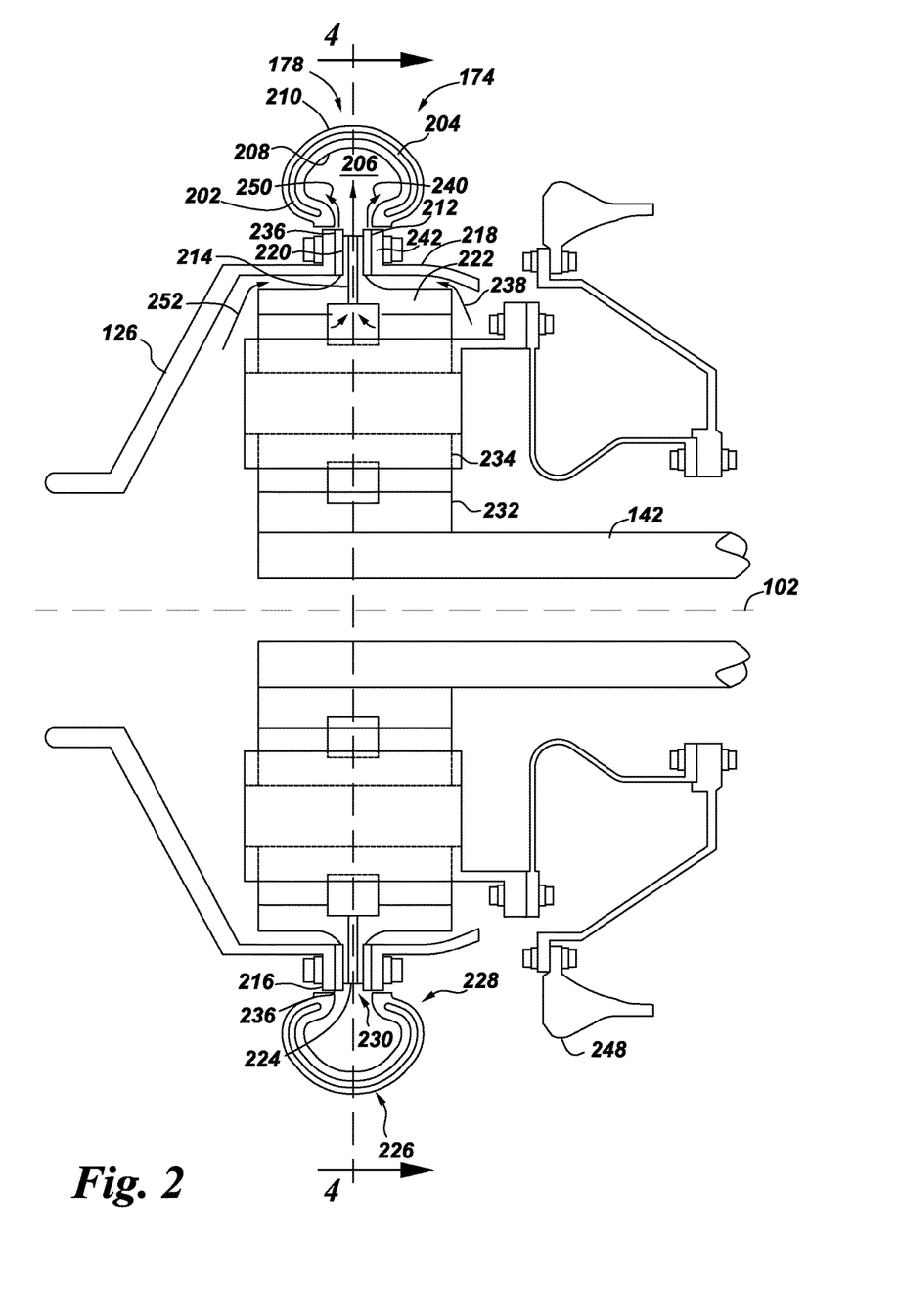
FIG. 2 is a partial cross-sectional view of an exemplary gear box and heat exchanger in accordance with some embodiments of the present invention.

Referring to FIG. 2, the heat exchanger 178 may be disposed in any location proximate the gears of the gear box that is suitable to remove a desired amount of heat from the oil. For example, in some embodiments, the heat exchanger 178 may be disposed about a peripheral edge 224 of an outer most gear (e.g., ring gear 222), such as shown in FIG. 2.

The heat exchanger 178 may generally comprise a body 202 defining a cavity 206 and a channel 204 disposed within the body 202. The body 202 may be statically disposed about the gear box 174 and supported by one or more components of the engine, for example, a portion of the engine frame 248 such as shown in FIG. 2. The body 202 may be fabricated from any material suitable to withstand operating conditions within the engine and provide a desired heat transfer between the oil and cooling fluid, for example, such as steel, titanium, or cobalt based alloys.

Figure 4:
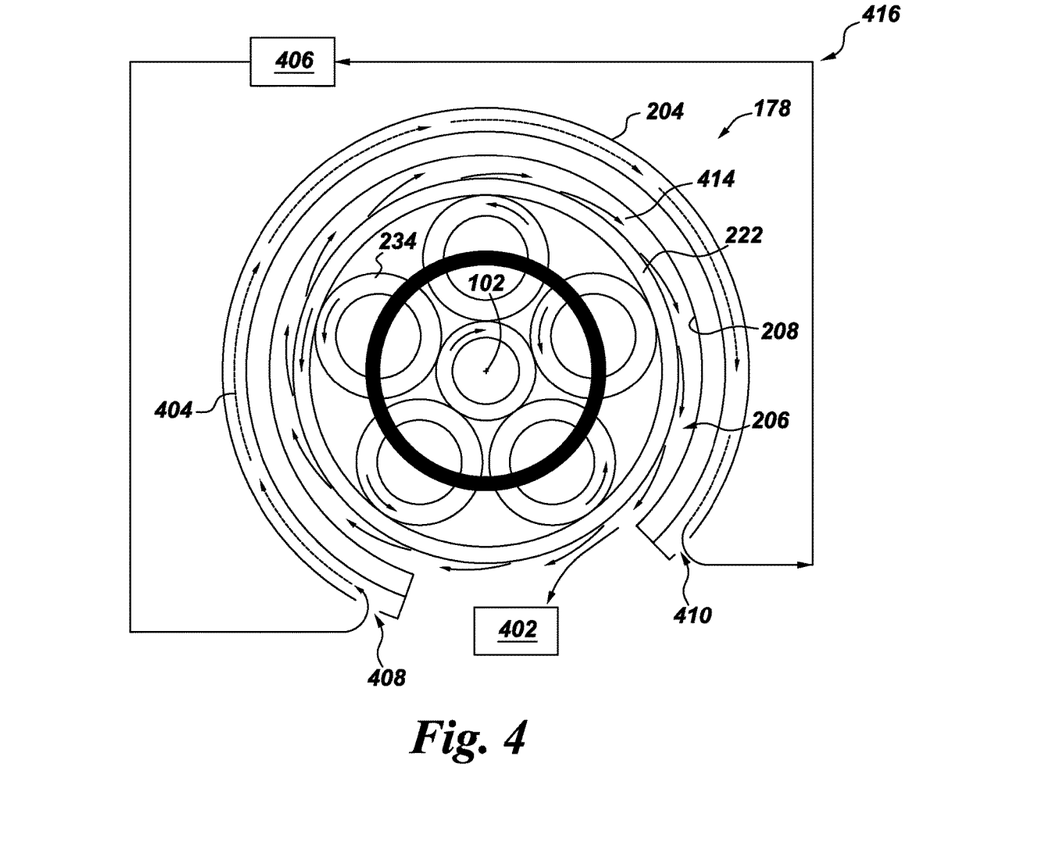
FIG. 4 is a partial cross-sectional view of an exemplary gear box and heat exchanger in accordance with some embodiments of the present invention.
Figure 5:
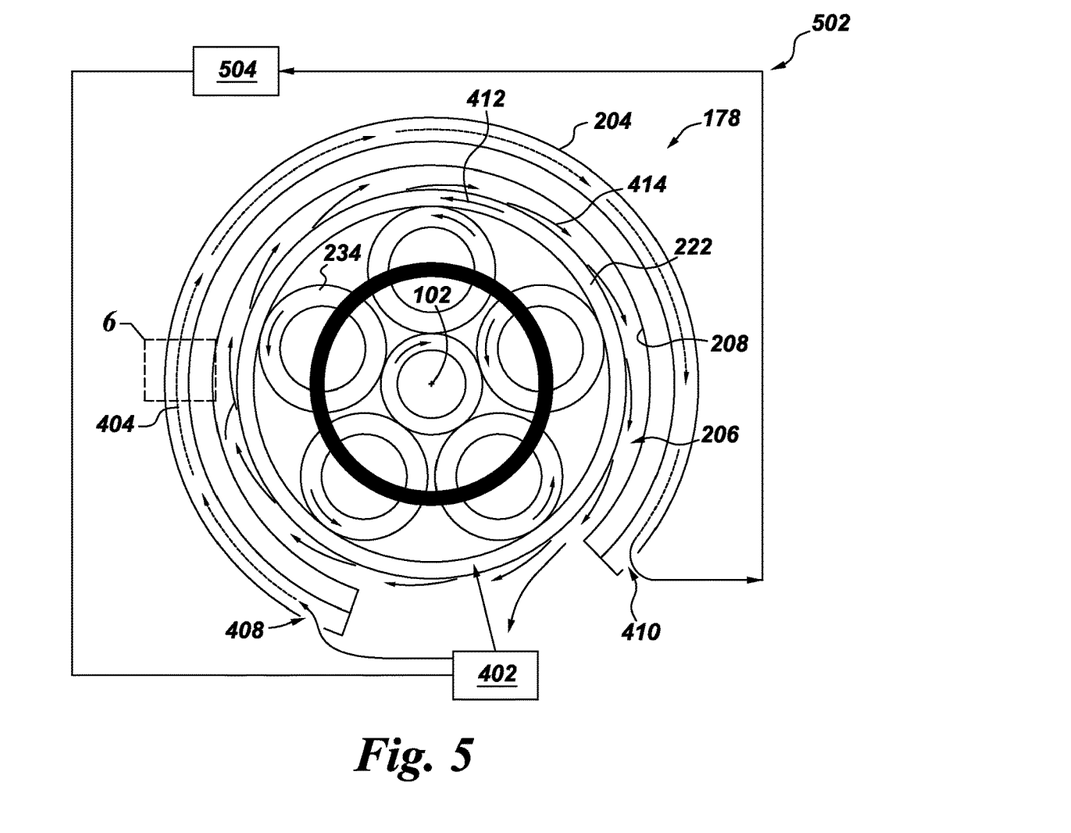
FIG. 5 is a partial cross-sectional view of an exemplary gear box and heat exchanger in accordance with some embodiments of the present invention.
Figure 6:
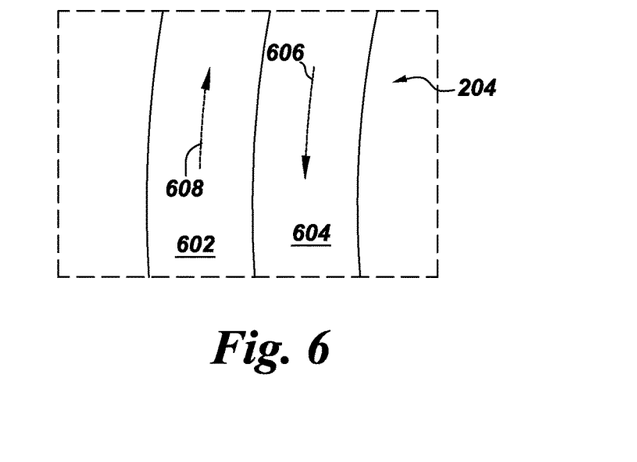
FIGS. 6-8 are partial cross-sectional views of a heat exchanger in accordance with some embodiments of the present invention.

The body 202 may have any cross sectional shape suitable to trap and/or contain oil expelled by the gears of the gear box 174, for example, such as an oil scoop. For example, in some embodiments, the body 202 may comprise a first portion 226 having a concave shape and a second portion 228 extending from the first portion 226, wherein the second portion 228 forms an inlet 230 that is fluidly coupled to the cavity 206. In addition, the body 202 may have an annular shape, for example, such as shown in FIGS. 2, 4 and 5. In such embodiments, the body 202 may conform or be contoured to the peripheral edge of the ring gear 222, thereby surrounding or encircling at least a portion, or in some embodiments substantially all of the ring gear 222. By surrounding or encircling at least the portion of ring gear 222 with the body 202 allows for a controlled collection of the oil as compared to conventional systems that allow unrestricted distribution of oil about various surfaces of the gear box.

The channel 204 provides a conduit to facilitate a flow of a cooling fluid throughout the body 202. The channel 204 may be shaped, sized or configured in any manner sufficient to provide a desired flow of the cooling fluid throughout the body 202, for example, such as the described below with respect to FIGS. 4-7. The cooling fluid may be any fluid suitable to facilitate the extraction of heat from the oil, for example such as oil (e.g., gear box oil, engine oil, or the like), poly-alpha-olefin (PAO), water, glycol, combinations thereof, or the like.

In some embodiments, a thermally insulating coating 210 may be disposed on an outer surface 210 of the body 202. When present, the thermally insulating coating may prevent heat flow from the surrounding ambient temperature and/or other engine components to the cooling fluid flowing through the channel 204.

The oil may be directed towards the body 202 of the heat exchanger 178 via one or more mechanisms. For example, in some embodiments, heated oil expelled from at least one of the sun gear 232, planet gears 234, planet bearings or ring gear 222 may be directed towards one or more scalloped portions 212, 236 formed in the flange 216 of the fan shaft (output shaft) 126 and/or flange 242 of a ring 218 (oil flow shown by arrows 252, 238) via the output shaft 126 geometry and/or the ring 218. The heated oil may then be directed into the cavity 206 of the body 202 via the scalloped portions 212, 236 (oil flow shown by arrows 240, 250). In another example, heated oil may be directed towards the body 202 via a plurality of though holes 214 formed by one or more scalloped or hallowed areas in one or both of flange sections 220 (e.g., bolted flanged section) of the ring gear 222.

In operation, oil utilized and heated within the gear box is directed towards the body 202 of the heat exchanger 178. The heated oil then enters the cavity 206 of the body 202 and comes in contact with a cooling surface (e.g., the inner surface 208 of the body 202). Heat is then extracted from the heated oil via the cooling fluid flowing through the channel 204 of the body 202. In some embodiments, the at least partially cooled oil may then be directed towards at least one of a sump, the gear box, an additional thermal circuit, or into the channel 204. Such embodiments are described below with respect to FIGS. 4-5.

Figure 3:
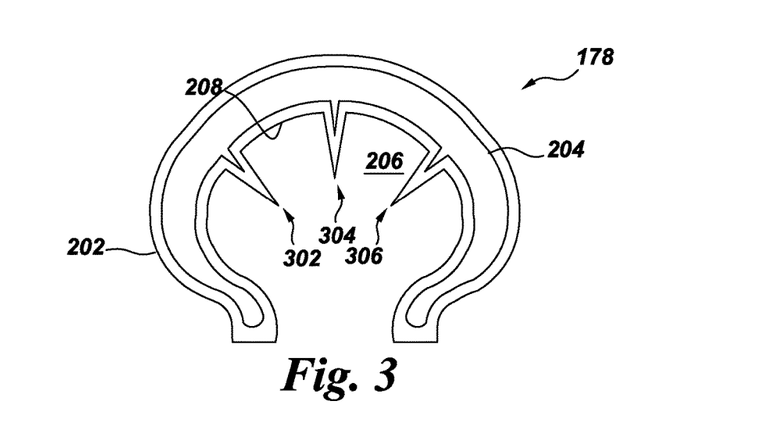
FIG. 3 is a partial cross-sectional view of a heat exchanger in accordance with some embodiments of the present invention.

Although shown as a continuous or flat surface, the inner surface 208 may comprise one or more features (e.g., fins, vanes, protrusions, or the like), for example the features 302, 304, 306 shown in FIG. 3. When present, the features 302, 304, 306 may provide an increased surface area to facilitate the transfer of heat from the oil to the cooling fluid disposed in the channel 204. The features 302, 304, 306 may be configured, sized or shaped in any manner suitable to provide the aforementioned increased surface area. In some embodiments, the size or shape of the features may be influenced by a desired balance between surface area and a pressure drop of the oil flowing through the cavity 206 and the cooling fluid flowing through the channel 204.

Referring to FIG. 4, in some embodiments, a sump 402 may be disposed proximate the heat exchanger 178. When present, the sump 402 functions to collect the cooled oil exiting the cavity 206 after it has been cooled (as described above). In some embodiments, the body 202 may comprise an inlet 408 and outlet 410 fluidly coupled to the channel 204. When present, the inlet 408 and outlet 410 allow the cooling fluid to enter and exit the channel 204.

In some embodiments, the channel 204 and cavity 206 may be isolated from one another, for example, such as shown in FIG. 4. In such embodiments, the cooling fluid flows through a separate thermal circuit 416 and, is thus, separate from the sump 402 and oil. For example, the cooling fluid may be provided to the channel 204 at the inlet 408. The cooling fluid then flows through the channel 204 and exits the channel 204 at the outlet 410. In some embodiments, the cooling fluid is provided to the channel 204 such that the cooling fluid flows in a direction (shown by arrow 404) that is opposite a direction of the rotation of the ring gear 222 (shown by arrow 412). As described above, heat is extracted from the oil flowing through the cavity 206 (gear box flow indicated by arrow 414) via the cooling fluid flowing through the channel 204 of the body 202. As the cooling fluid extracts heat from the oil, the cooling fluid is heated. Upon exiting the channel 204 at outlet the heated cooling fluid may be passed through an additional heat exchanger (heat sink) 406 of the thermal circuit 416, where the heated cooling fluid is cooled. The cooled cooling fluid may then be returned to the inlet 408 of the channel 204.

Alternatively, in some embodiments, the cooling fluid may be the oil and, in such embodiments, a common thermal circuit 502 is utilized, for example, such as shown in FIG. 5. In such embodiments, the oil that is expelled from the gear box and cooled via cooling mechanism of the cavity 206 (e.g., as described above) exits the cavity 206 and is collected by the sump 402. The cooled oil may then be directed to the gear box to provide lubrication for the gears or directed to the channel 204 to function as the cooling fluid. When directed to the channel 204, the oil enters the channel 204 via the inlet 408 and flows through the channel 204 and extracts heat from the oil flowing through the cavity 206, thereby being heated. The heated oil then exits the channel 204 via the outlet 410 and may be passed through an additional heat exchanger 504 (heat sink), where it is cooled and subsequently returned to the sump 402.

Although the channel 204 is shown as having a single flow path in FIGS. 4 and 5, the channel 204 may be configured in any manner suitable to provide the extraction of heat from the oil as described herein. For example, referring to FIG. 6, in some embodiments, the channel 204 may comprise a plurality of flow paths (two flow paths 602, 604 shown). In such embodiments, the flow paths may be configured such that the cooling fluid in adjacent flow paths 602, 604 flow in opposite directions (flow of cooling fluid in each flow path 602, 604 indicated by arrows 606, 608). In some embodiments, the flow paths 602, 604 may be fluidly coupled to one another and arranged in alternating or recursive patterns throughout the channel 204.

Figure 7:
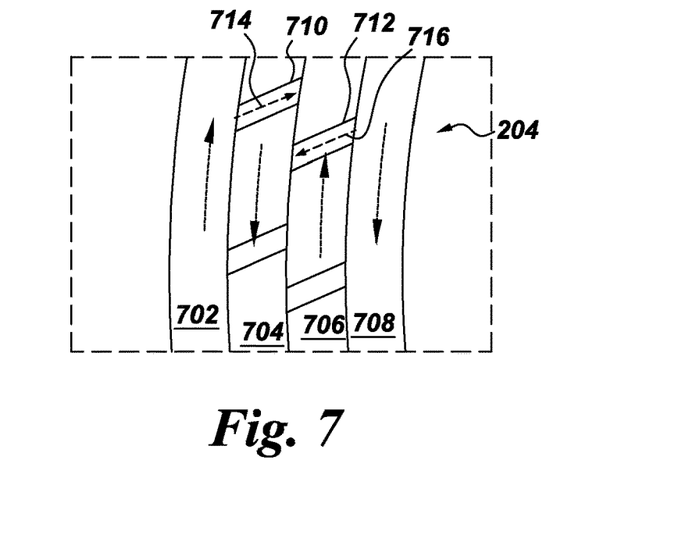

Referring to FIG. 7, in some embodiments, the channel 204 may comprise a first set of flow paths 702, 706 and a second set of flow paths 704, 708, wherein the flow paths of each set are coupled to one another via a plurality of conduits 710, 712. In such embodiments, the presence of the plurality of conduits 710, 712 allow for a cooled flow of oil and/or cooling fluid to flow across a heated flow of oil and/or cooling fluid, thereby providing a cross-flow heat exchanging arrangement. For example, cooled cooling fluid may flow through a first flow path (flow path 702) that is adjacent to a heated oil flow in a second flow path (flow path 704). The cooled cooling fluid may also flow (indicated by arrow 714) from the first flow path (flow path 702) across the second flow path 704 to a third flow path (flow path 706). Such a flow of the cooling fluid across the second flow path 704 functions to extract heat from the heated oil flowing in the second flow path 704. Similarly, cooled oil may flow through a fourth flow path (flow path 708) adjacent to the heated cooling fluid in the third flow path 706. The cooled oil may also flow (indicated by arrow 716) from the fourth flow path 708 across the third flow path 706 to the second flow path 704. Such a flow of the oil across the third flow path 706 functions to extract heat from the heated cooling fluid flowing in the third flow path 706.

Figure 8:
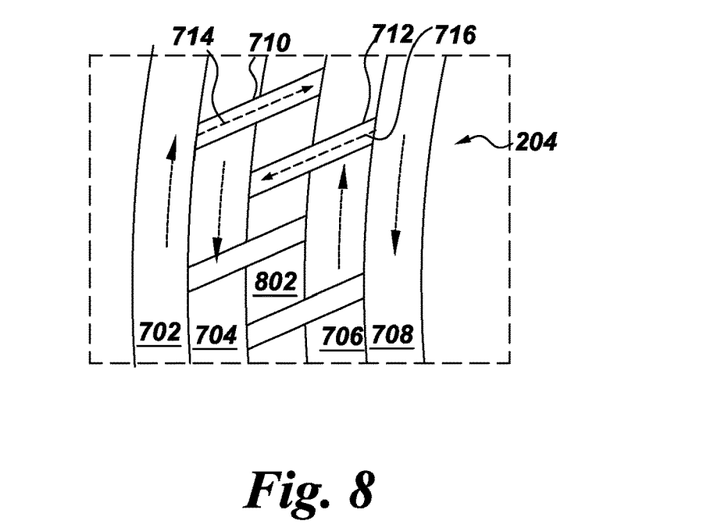

Referring to FIG. 8, in some embodiments, one or more channels (e.g., channel 802) may be disposed between two or more of the flow paths (e.g., flow paths 704, 706), wherein the channel 802 does not have cooling fluid or oil disposed therein. Although only a limited number of shown flow paths and conduits are shown in FIGS. 7-8, any number of flow paths and conduits may be present and may be arranged in any manner suitable to provide the exchange of heat as provided herein.

Thus, embodiments of an apparatus for oil collection and heat exchanging for turbine engines has been provided herein. Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A heat exchanger for a turbine engine, the heat exchanger comprising:
 a body configured to be disposed proximate and at least partially surrounding a heat source, wherein the body defines a cavity to capture a heated fluid expelled from the heat source;
 a channel formed in the body, the channel fluidly coupled to a heat sink; and
 a thermally insulating coating disposed on an outer surface of the body.

2. The heat exchanger of claim 1, wherein the body comprises:
 a first portion having a concave shape; and
a second portion extending from the first portion, the second portion forming an inlet, wherein the inlet is fluidly coupled to the cavity.

3. The heat exchanger of claim 1, further comprising:
 a sump disposed proximate the body.

4. The heat exchanger of claim 1, wherein the heat source is one or more gears of a gear box, and wherein the body is disposed about a peripheral edge of the one or more gears.

5. The heat exchanger of claim 4, wherein the heated fluid is engine oil.

6. The heat exchanger of claim 1, wherein the channel comprises a cooling fluid disposed therein.

7. The heat exchanger of claim 1, wherein the channel defines a plurality of separate flow paths.

8. The heat exchanger of claim 7, further comprising a plurality of conduits
 fluidly coupling at least two of the plurality of separate flow paths, wherein the plurality of conduits intersect at least one of the plurality of separate flow paths.

9. A gas turbine engine comprising:
 a fan having a fan shaft;
 a first shaft rotatably coupling a first turbine to a second turbine;
 a gear box rotatably coupling the first shaft to the fan shaft; and
 a heat exchanger disposed proximate the gear box, the heat exchanger comprising:
  a body configured at least partially surrounding at least one gear of the gear box, wherein the body defines a cavity to capture a heated fluid expelled from the heat source;
  a channel formed in the body, the channel fluidly coupled to a heat sink, wherein the channel defines a plurality of separate flow paths; and
  a plurality of conduits fluidly coupling at least two of the plurality of separate flow paths, wherein the plurality of conduits intersect at least one of the plurality of separate flow paths.

10. The gas turbine engine of claim 9, wherein the body comprises:
 a first portion having a concave shape; and
 a second portion extending from the first portion, the second portion forming an inlet, wherein the inlet is fluidly coupled to the cavity.

11. The gas turbine engine of claim 9, further comprising:
 a thermally insulating coating disposed on an outer surface of the body.

12. The gas turbine engine of claim 9, further comprising:
 a sump disposed proximate the body.

13. The gas turbine engine of claim 9, wherein the heated fluid is oil.

14. The gas turbine engine of claim 9, wherein the channel comprises a cooling fluid disposed therein.

* * * * *